March 19, 1968 N. K. KOEBEL ET AL 3,374,476
METHOD OF AND APPARATUS FOR DETECTING MOISTURE
IN NON-CONDUCTING LIQUIDS
Filed Jan. 18, 1965 2 Sheets-Sheet 2
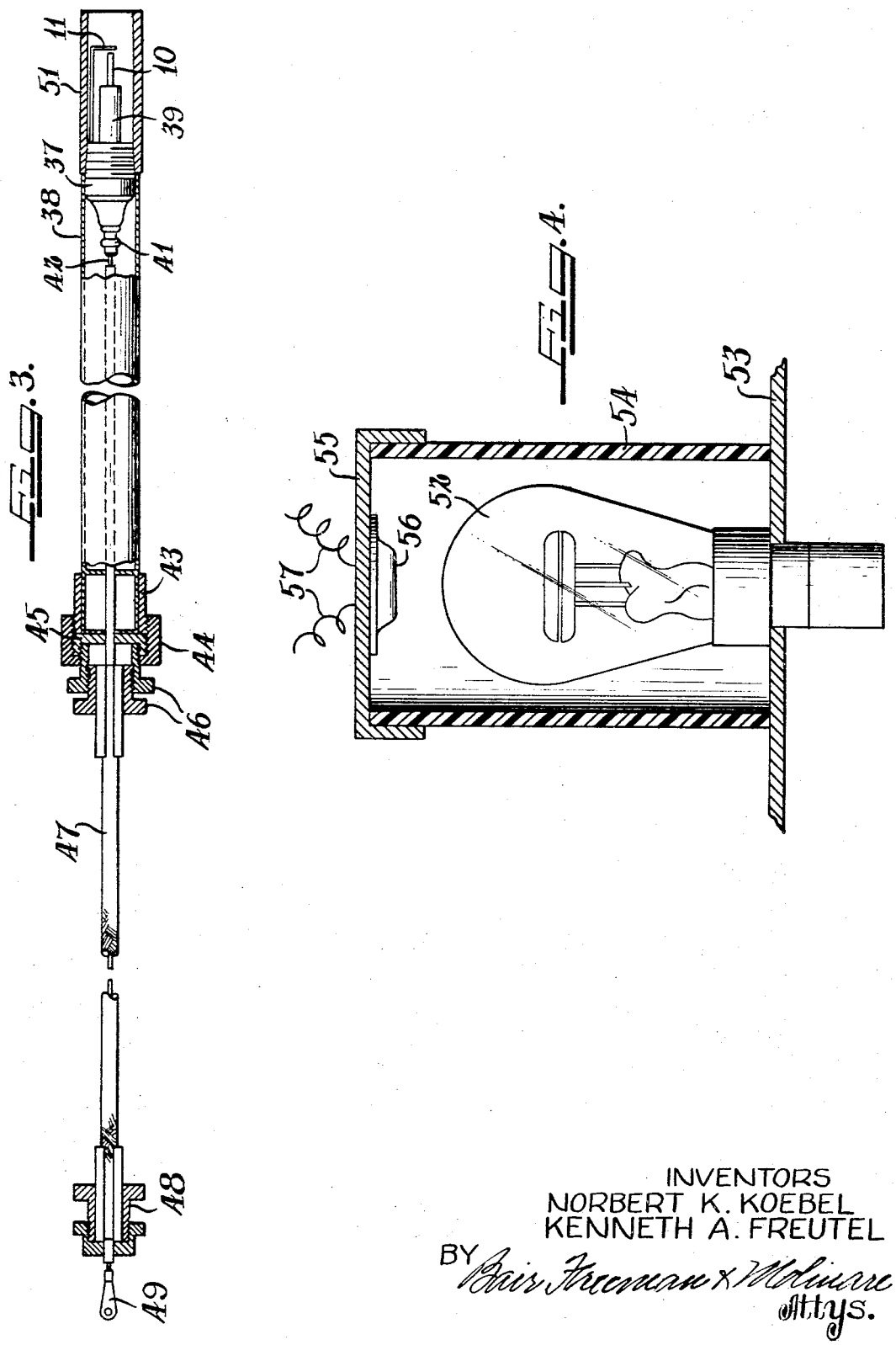
INVENTORS
NORBERT K. KOEBEL
KENNETH A. FREUTEL
BY
Attys.

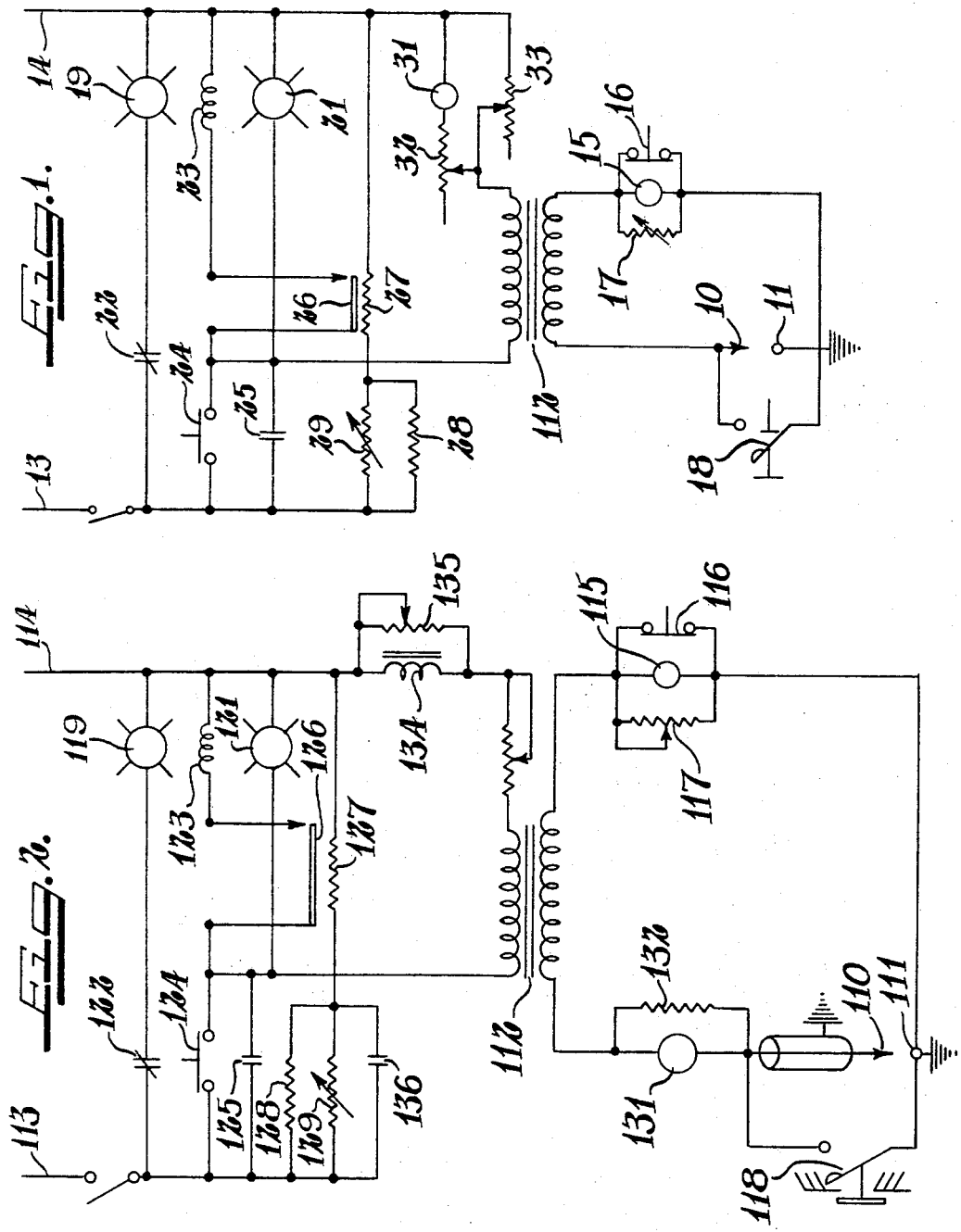

United States Patent Office 3,374,476
Patented Mar. 19, 1968

3,374,476
METHOD OF AND APPARATUS FOR DETECTING MOISTURE IN NON-CONDUCTING LIQUIDS
Norbert K. Koebel, Maywood, and Kenneth A. Freutel, Franklin Park, Ill., assignors to Basic Products Corporation, a corporation of Wisconsin
Filed Jan. 18, 1965, Ser. No. 426,173
12 Claims. (Cl. 340—235)

ABSTRACT OF THE DISCLOSURE

A detector for moisture in oil having spaced electrodes immersed in the oil and a time delay device started by current discharge between the electrodes and which actuates a signal when it times out. The electrode current controls a radiant energy emitter which when energized, initiates operation of the time delay device.

---

This invention relates to a method and apparatus for detecting moisture in non-conductive liquids and more particularly to the detection of water in oil or liquid hydrocarbons.

In heat treating operations wherein the products are quenched in oil tanks serious accidents or fires have resulted from the presence of an excess quantity of water in the quenching oil resulting from leaks in heat exchangers or water-jacketed systems. If a load of hot metal is quenched in an oil tank containing water, the steam generated will cause the oil to boil over the top of the tank or to blow out of the tank with explosive violence depending upon the amount of water in the oil. Since incandescent hot metal is frequently being quenched, the oil may flash with the result that burning oil may be spewed about the plant and over operating personnel. Tests have shown that approximately 0.5% water by volume will cause oil in a quenched tank to boil vigorously when hot metal is quenched. Water in amounts up to 0.4% can be tolerated without causing dangerous boiling. Some oils will hold as much as 0.1% to 0.15% water in solution and this amount does not create any difficulty. However, water exceeding about 0.15% will be held in the oil in an emulsion state in an agitated quench tank or may settle out to the bottom of a still quench tank. On this basis, it is desirable to indicate when a quench tank contains an amount of water between 0.2% and 0.4%. Detection of water within this range will enable the water to be boiled off of the oil or otherwise removed therefrom before dangerous conditions can arise.

One device which has been proposed for detecting the presence of excess water in oil works on the principle of a hydroscopic salt which will absorb water and whose conductivity will accordingly be varied. This method is subject to several disadvantages. First, once the salt cell has absorbed water, it must be replaced and, secondly, the absorption of water by the cell is cumulative so that even small quantities which would not create a dangerous condition may be continuously absorbed until the cell erroneously indicates a dangerous condition. Furthermore, even where there is no water in the oil the cell tends to become clogged with dry oil and to become sluggish or totally ineffective in detecting dangerous amounts of water.

Experiments have indicated that the principles of detecting water in oil by means of conductivity or resistivity electrical measurement is not practical. The temperature of the quench oil may vary over a relatively wide range and all conductivity or resistivity sensing devices are temperature sensitive. Furthermore, quench oils in common use are compounded with wetting agents, antioxidants, and various other compounds to increase the flash and fire points of the oil and these variations in the chemical nature of the oils makes it difficult, if not impossible, to provide a conductivity or resistivity sensing device which will function under all conditions. Additionally, the quench oil may be oxidized resulting in carbon precipitation, acidity and varnish-like substances and may contain metal particles and scale from the metal being treated all of which will interfere with conductivity or resistivity measurements.

Many of these problems are also encountered in attempting to detect moisture in other types of oil or other hydrocarbon liquids such as fuel oils and the like.

It is accordingly an object of the present invention to provide a method of an apparatus for detecting moisture in non-conductive liquids which utilizes the dielectric breakdown of the liquid which is in turn dependent upon the percentage of moisture or water in the liquid to produce an indication.

Since the sensing device might be tripped improperly by the accidental presence of a single large globule of water or by stray scale metal or carbon particles when the actual percentage of water in the liquid is within safe limits, it is another object of the invention to introduce a time delay into the operation of the indicating means to give such water globules or other particles time to clear the sensing device and to provide a signal which is entirely responsive to the percentage of water present.

According to a feature of the invention, spaced electrodes are immersed into the liquid and are connected in an electrical circuit with indicating means being responsive to current flow in the circuit. In the preferred construction, the electrodes are connected to the secondary of a transformer and the indicating means which operates on low voltage is responsive to the current flow in the transformer primary.

According to another feature of the invention, operation of the time delay relay is initiated by a variable resistance device such as a photoelectric cell which is responsive to a radiant energy source such as a gaseous discharge lamp which is energized in response to the current flow in the circuit.

The above and other objects and features of the invention will be more readily apparent from the following description when read in connection with the accompanying drawings, in which:

FIGURE 1 is a circuit diagram of one form of moisture detecting apparatus embodying the invention;

FIGURE 2 is a similar circuit diagram of an alternative form of the apparatus;

FIGURE 3 is a side elevation, with parts in section of a probe and electrode structure according to the invention; and FIGURE 4 is a sectional view of a lamp and variable resistance device.

Referring first to the circuit shown in FIGURE 1, a pair of spaced electrodes 10 and 11 defining a spark gap and which may be provided by the electrodes of a conventional spark plug are immersed into the liquid such as the oil in a quench tank in which the moisture content is to be detected. These electrodes are connected across the secondary of a transformer 12 whose primary is supplied from a conventional power source indicated by the lines 13 and 14. Preferably, the electrodes are connected in circuit with an indicating lamp 15 such as a gaseous discharge lamp shunted by a manually operable switch 16 and a variable resistor 17 which is provided in the circuit for test purposes. Additionally, the electrodes may be shunted by a switch 18 which can be closed or substantially closed for testing the overall performance of the circuit.

The condition of the circuit and of the liquid to be tested is indicated by an alarm signal lamp 19 and a guarding signal lamp 21. The alarm lamp 19 is connected in circuit through normally closed relay contacts 22 which are opened when a relay coil 23 is energized. The relay coil 23 is connected between the power lines 13 and 14 through a reset switch 24 which is normally open or alternatively through relay contacts 25 which are normally opened but which are closed when the coil 23 is energized and through a time delay switch 26. The time delay switch 26 may be of any conventional construction but is illustrated as comprising a heater coil 27 heating a bimetal strip constituting a part of the switch 26 and which will open the switch 26 a predetermined time after the heater coil 27 is supplied with heating current.

The heater coil 27 is connected between the power lines 13 and 14 through a resistor 28 which may have a high value on the order of 10K and through a variable resistor 29 parallel to the resistor 28 and whose value may vary from an extremely high open circuit value to a relatively low value. In the preferred form the resistor 29 may be a photoelectric cell which is substantially non-conducting when it is not exposed to light and whose resistance falls to a relatively low value when it is exposed to light. Similarly, a variable resistor which is heat sensitive could be employed equally well.

The resistor 29 is responsive to the condition of a radiant emission energy device 31 which is preferably a gaseous discharge tube such as a neon lamp. As shown, the tube 31 is connected through a calibrator resistor 32 in shunt with an adjusting rheostat 33 which is in series with the primary winding of transformer 12. Therefore, the radiant emission device 31 is responsive to current flow in the primary winding of the transformer.

In operation of the circuit as so far described and assuming that switch 16 is closed as shown and switch 18 is open, the reset switch 24 may be temporarily closed to energize the relay coil 23 through the closed time delay switch 26. This will open the switch 22 to extinguish the lamp 19 and will close the switch 25 to close a holding circuit for the relay coil 23 through the switch 26. Simultaneously, the signal lamp 21 will be energized to indicate that the circuit is in operated condition. If the oil in which the electrodes 10 and 11 are immersed is dry and, consequently, has a high dielectric strength, the current flow across the electrodes will be very small and the primary current flow in the transformer will be correspondingly small.

If now the oil should accumulate a quantity of moisture in excess of the amount at which the circuit is adjusted, dielectric breakdown will occur between the electrodes 10 and 11 and the current flow in the transformer secondary circuit will increase and there will be a corresponding increase in the primary current flow. At this time the voltage across the emission device 31 will reach the breakdown voltage of the emission device and it will emit radiant energy in the form of either light or heat to reduce the resistance of the resistor 29. At this point, heat current will flow through the heat coil 27 to heat the bimetal strip in the time delay relay. A predetermined time after initiation of the heat current, the time delay relay switch will open to deenergize the relay coil 23 thereby opening the switch 25 to extinguish the signal lamp 21 and closing the switch 22 to energize the signal lamp 19. The signal lamp 19 may be a red light or could be an audible signal indicating that the quench oil is in a dangerous condition. The operator is thereby warned that he should take steps to remove excessive moisture from the oil before using it for quenching.

To test the device, the switch 16 may be opened to check the condition of the electrodes. When this switch is opened secondary transformer current will flow through the resistor 17 and will impress a voltage across the lamp 15 sufficient to cause a faint glow in the event the secondary current is within the desired safe range. No visible glow at this lamp would indicate an open circuit due, for example, to a broken conductor and a bright glow would indicate an abnormally high secondary current indicative of a shorted or semi-shorted condition of the electrodes. Closing of the switch 18 or bringing the electrodes of this switch sufficiently close together to cause a discharge comparable to that resulting from excessive moisture in the oil will cause the entire circuit, except the electrodes, to function in exactly the same manner as an excessive quantity of moisture in the oil. These two relatively simple checks can therefore check the complete circuit to indicate whether or not it is in proper operative condition.

FIGURE 2 shows a circuit essentially similar to that of FIGURE 1 with the exception that the glow lamp is connected in the high voltage secondary circuit of the transformer and is a high voltage unit. Parts in this figure corresponds to like parts in FIGURE 1 and are designated by the same reference numerals plus 100.

As shown in FIGURE 2, the glow lamp 131 is connected in parallel with a resistor 132 and in series in the transformer secondary circuit with the electrodes 110 and 111. When the secondary current is low, due to low current discharge across the electrodes, sufficient voltage is present across the glow lamp to ionize it, but the resistor 132 shunts enough current to keep the light intensity to a low enough level so that the variable resistor 129 will present a high resistance to current flow and the heating coil 127 will not be heated. When the water in the oil increases to a dangerous value, the discharge between electrodes 110 and 111 will increase to cause an increased current flow through the glow lamp and resistor 132. This will increase the brilliance of the glow lamp that will act on the variable resistor 129 to reduce its resistance. This will increase the voltage on the glow lamp 131 to its breakdown value at which time it will light and will act on the variable resistor 129 to reduce its resistance. The operation of the remainder of the circuit is identical with that described above in connection with FIGURE 1.

It has been found, however, that when a high voltage glow lamp is used in the secondary circuit an extremely heavy secondary current such as might be caused by a metallic object substantially shorting across the electrodes or an extremely high percentage of water in the oil will lower the voltage on the glow tube to below its ionizing potential so that there will be insufficient emission to operate the variable resistor 129. To protect against this possibility, a relay coil 134 shunted by a variable resistor 135 is connected in series in the primary circuit in the transformer. The relay coil when energized by a high current flow resulting from conditions such as those described above will close a normally open switch 136 in shunt with the resistors 128 and 129. When the switch 136 is closed, the time delay relay heater 127 will be energized to cause the circuit to operate to indicate a dangerous condition.

FIGURES 3 and 4 illustrate the construction of the electrode carrying probe and of the glow lamp and variable resistor. As shown in FIGURE 3, the electrodes 10 or 110 and 11 or 111 may be provided by the electrodes of a conventional spark plug and of the type normally used for ignition oil burners although a conventional automotive spark plug could be employed. The metal body 37 of the spark plug is preferably formed of a smooth circular configuration to fit into a metal mounting tube 38 into which the metal body 37 is soldered or otherwise sealingly secured. The ceramic body 39 of the spark plug which carries the electrode 10 insulates the electrode from the body 37 and tube 38 and terminates in the usual connector 41 which is connected to an insulated lead wire 42. The lead wire 42 extends through the tube 38 and through a cap structure at the outer end of the tube which provides a sealing closure for the tube. As shown, the cap structure comprises a cap 43 secured over the end of the tube to which a gland nut 44 is threaded. The gland nut secures a sealing partition 45 which is formed with a central opening to pass the insulated lead 42. A separate pair of nut members 46 are threaded into the gland nut and engage a metal braid 47 which surrounds the insulated lead 42 beyond the tube. The metal braid extends into the electrical connections to a metal fitting 48 with the insulated lead 42 extending beyond the fitting and terminating in a connector 49.

With the probe assembly completed as shown, the connector 49 may be connected to one side of the transformer secondary with the fitting 48 being connected to the other side thereof. The tube 38 may then be inserted in a quench tank or other container for the liquid to be tested with the electrodes 10 and 11 submerged in the tank or container to a desired depth. It will be understood that the tube 38 and the lead 42 and braid 47 may be made of any desired length to accommodate installation conditions. Preferably, also, the electrodes are protected by a cover tube 51 secured to the metal body 37 of the spark plug and extended beyond the electrodes to prevent damage thereof from being struck by material being quenched or other objects. The tube section 51, as shown, is open at its bottom and may be provided with suitable openings in its side wall for circulation of the liquid therethrough.

With this construction when the probe is inserted in a quench tank or the like in which the cooling oil is agitated in the usual manner, there will be a circulation of oil around and between the electrodes. Any water globules which may enter the space between the electrodes will be washed out of that space in a very short time and due to the provision of the time delay relay will not cause a false indication to be produced.

FIGURE 4 illustrates one desirable construction of the glow lamp 31 or 131 and the variable resistor 29 or 129 which is responsive thereto. As shown in this figure, a conventional neon lamp 52 is mounted on a supporting plate 53 and is enclosed by a tube 54 which is preferably of a non-conductive material such as a relatively hard plastic. If desired, the interior of the tube may be silver or painted white to increase the reflection. The upper end of the tube above the glow lamp is closed by a metal cover 55 which functions as a heat sink to dissipate heat from the variable resistor. The variable resistor as shown at 56 may be in the form of a photoelectric cell secured to the under surface of the cover 55 immediately above the glow lamp and with its leads as shown at 57 extending through the cover and insulated therefrom.

With this construction all emission from the glow lamp is effectively directed on to the variable resistor 56 so that it will respond rapidly and accurately to energization of the glow lamp to initiate functioning of the time delay relay.

While two embodiments of the invention have been shown and described in detail, it will be understood that they are for the purposes of illustration only and are not to be taken as a definition of the scope of the invention, reference being had for this purpose to the appended claims.

What is claimed is:

1. The method of detecting a potentially dangerous concentration of moisture in electrically non-conducting quenching oil which comprises impressing a voltage across spaced electrodes, immersing the electrodes in a body of the liquid, causing a circulation of the liquid around and between the electrodes, initiating a time delay interval in response to the current flow between the electrodes when it exceeds a predetermined value, and producing a signal at the end of the time delay interval.

2. The method of claim 1 in which the time delay interval is interrupted by reduction of the current flow below said predetermined value.

3. The method of detecting a potentially dangerous concentration of moisture in electrically non-conducting quenching oil which comprises the steps of impressing a voltage across spaced electrodes, immersing the electrodes in a body of the liquid, causing a circulation of the liquid around and between the electrodes, causing radiation of energy in response to current flow between the electrodes in excess of a predetermined value, varying the flow of current in a circuit independent of the electrodes in response to said radiation of energy, initiating a time delay interval in response to a change in the flow of current in said independent circuit, and producing a signal at the end of the time delay interval.

4. Apparatus for detecting a potentially dangerous concentration of moisture in a bath of industrial furnace quenching oil which comprises a probe adapted to be inserted in said bath, a pair of spacer electrodes carried by the probe to be immersed in said quenching oil, an electric circuit connected to the electrodes to impress a voltage across them whereby flow of current in the circuit will be directly related to the dielectric strength of the oil between the electrodes, time delay means, means responsive to flow of current in the circuit in excess of a predetermined amount to initiate operation of the time delay means, and signal means connected to the time delay means to be actuated thereby a predetermined time after initiation of operation thereof.

5. Apparatus for detecting a harmful concentration of moisture in non-conducting liquid which comprises a tubular probe adapted to be inserted in a body of liquid, a pair of spaced electrodes positioned at one end of said tubular probe so as to be immersed in the liquid, a body of insulating material supporting said spaced electrodes at said one end of said probe and sealingly engaged with the interior surface of said probe so as to seal off the remainder of said probe from said liquid, an electric circuit connected to the electrodes to impress a voltage across them whereby flow of current in the circuit will be directly related to the dielectric strength of the liquid between the electrodes, means connected to the circuit to produce radiant energy in response to current flow in the circuit above a predetermined value, a relay, time delay means responsive to emission of radiant energy by the last named means for a predetermined period of time to energize the relay, and a warning signal generator actuated by the relay when the relay is energized.

6. Apparatus for detecting undesirable concentrations of moisture in non-conducting liquid which comprises a probe adapted to be inserted in a body of liquid, a pair of spaced electrodes carried by the probe to be immersed in the liquid, an electric circuit connected to the electrodes to impress a voltage across them whereby flow of current in the circuit will be directly related to the dielectric strength of the liquid between the electrodes, means connected to the circuit to produce radiant energy in response to current flow above a predetermined value in the circuit, a time delay relay, means responsive to emission of radiant energy by the last named means to initiate operation of the time delay relay.

7. Apparatus for detecting undesirable concentrations of moisture in non-conducting liquid comprising a probe adapted to be inserted in a body of liquid, a pair of spaced electrodes carried by the probe to be immersed in the liquid, a transformer having a primary circuit and a secondary circuit, the electrodes being connected in the secondary circuit, a time delay relay, means responsive to current flow in excess of a predetermined value in one of the circuits to initiate operation of the time delay relay, and signal means connected to the time delay relay to be operated thereby a predetermined time after initiation of operation thereof.

8. An arrangement for detecting the presence of a hazardous concentration of moisture in a tank of quenching oil, said arrangement comprising, in combination, a pair of spaced-apart electrodes immersed in said quenching oil, an energizing circuit for applying a voltage across said electrodes, said voltage being of sufficient magnitude to create a dielectric breakdown current flow between said electrodes, the average magnitude of said current flow being directly related to the concentration of moisture in said quenching oil, a threshold device coupled to said energizing circuit for producing an output whenever said current flow between said electrodes exceeds a predetermined value, an alarm, and time delay means for actuating said alarm whenever said output is produced by said threshold device for a predetermined accumulated period of time.

9. An arrangement as set forth in claim 8 including an indicating lamp serially connected in said energizing circuit, said lamp being adapted to glow dimly under normal conditions, to glow brightly and continually in the event said electrodes are short-circuited, to flicker sporadically when a high concentration of moisture exists in said oil, and not to glow when said energizing circuit is open-circuited.

10. An arrangement as set forth in claim 8 wherein said threshold device comprises the parallel combination of gaseous discharge lamp and an impedance, said parallel combination being connected in series relation with said energizing circuit, and wherein the operation of said time delay device is initiated in response to the radiant energy emitted by said discharge lamp.

11. An arrangement as set forth in claim 10 wherein said time delay device comprises a bimetallic switching element, an electric heater thermally coupled to said bimetallic element, and a photoelectric cell positioned to receive radiant energy from said discharge lamp, said photoelectric cell being connected in series with said electric heater to control the flow of current therethrough in response to the radiation of energy from said discharge lamp.

12. A method for detecting a potentially hazardous concentration of moisture in excess of about .2% by volume in an industrial furnace oil quenching tank, said tank normally containing oil, electrically conductive impurities suspended therein, and non-hazardous concentrations of moisture, said method comprising the steps of:

immersing a pair of spaced-apart electrodes in said oil, impressing a voltage across said electrodes, circulating the oil in said tank around and between said electrodes, generating a control output whenever the magnitude of current flow between said electrodes is in excess of a predetermined threshold value, and actuating an alarm whenever said control output exists for a predetermined accumulated period of time.

References Cited

UNITED STATES PATENTS

| | | | |
|---|---|---|---|
| 861,003 | 7/1907 | Wagner | 340—235 |
| 2,642,478 | 6/1953 | Lasky et al. | 340—235 |
| 2,295,927 | 9/1942 | Botteron | 340—235 |
| 2,743,432 | 4/1956 | Kerr | 340—235 |
| 2,910,940 | 11/1959 | Colman et al. | 340—235 X |
| 3,062,961 | 11/1962 | Kalns et al. | 250—206 |
| 2,552,088 | 5/1951 | Davis | 340—270 |

JOHN W. CALDWELL, *Primary Examiner.*

NEIL C. READ, *Examiner.*

D. L. TRAFTON, *Assistant Examiner.*